United States Patent [19]

McGaffigan

[11] Patent Number: 5,406,055
[45] Date of Patent: Apr. 11, 1995

[54] APPARATUS FOR EXPANDING/SHRINKING ARTICLES

[75] Inventor: Thomas H. McGaffigan, Half Moon Bay, Calif.

[73] Assignee: Metcal, Inc., Menlo Park, Calif.

[21] Appl. No.: 70,944

[22] Filed: Jun. 4, 1993

Related U.S. Application Data

[62] Division of Ser. No. 691,821, Apr. 26, 1991, Pat. No. 5,231,267.

[51] Int. Cl.[6] .............................................. H05B 6/10
[52] U.S. Cl. .................................... 219/643; 219/632; 219/634; 156/86; 156/143; 156/272.2
[58] Field of Search ............... 219/643, 644, 632, 633, 219/635, 634, 10.41, 10.43, 10.491, 10.53, 10.57, 10.75, 85.1; 156/86, 272.2, 272.4, 143; 29/450, 421 R; 228/132, 135; 428/36, 913; 174/DIG. 8

[56] References Cited

U.S. PATENT DOCUMENTS

| | | | |
|---|---|---|---|
| 3,253,618 | 5/1966 | Cook | 138/125 |
| 3,597,372 | 8/1971 | Cook | 138/125 |
| 3,945,867 | 3/1976 | Heller et al. | 156/143 |
| 4,035,534 | 7/1977 | Nyberg | 428/36 |
| 4,449,281 | 5/1984 | Yoshida et al. | 29/421 R |
| 4,598,857 | 7/1986 | Matsui | 228/132 |
| 4,868,967 | 9/1989 | Holt et al. | 29/450 |
| 4,914,267 | 4/1990 | Derbyshire | 219/85.1 |
| 4,915,139 | 4/1990 | Landry et al. | 138/125 |
| 5,208,443 | 5/1993 | McGaffigan | 219/505 |
| 5,231,267 | 7/1993 | McGaffigan | 219/10.41 |

*Primary Examiner*—Bruce A. Reynolds
*Assistant Examiner*—Tu Hoang
*Attorney, Agent, or Firm*—Burns, Doane, Swecker & Mathis

[57] ABSTRACT

An apparatus for producing a heat recoverable plastic article such as a tube by deforming the article from a heat-stable configuration to a heat-unstable configuration. The heat-unstable configuration will return to the heat-stable configuration when the article is heated to above the heat recovery temperature. The article is heated such that the article is at a temperature no lower than the heat recovery temperature during the deforming step by lossy particles dispersed in the article or in a tool used in the deforming step. The lossy particles allow auto-regulated heating of the article since the particles cannot be heated beyond their Curie transition temperature when subjected to an alternating magnetic field. These particles are preferably ferrites. Alternatively, the tool can include a braided mesh tubing of a ferromagnetic alloy wire. The article is cooled in the heat-unstable configuration to a temperature below the heat recovery temperature while preventing the article from returning to the heat-stable configuration. The tool can be a mandrel, expandable tube or caterpillar.

32 Claims, 4 Drawing Sheets

APPARATUS FOR EXPANDING/SHRINKING ARTICLES

This application is a divisional of application Ser. No. 07/691,821, filed Apr. 26, 1991, now U.S. Pat. No. 5,231,267.

CROSS REFERENCE

This application is related to an earlier filed patent application entitled "Temperature Auto-Regulating, Self-Heating Recoverable Articles" filed on Sep. 8, 1989, with Ser. No. 07/404,621 by the same inventor.

1. Field of the Invention

This invention relates to heat-recoverable articles, sleeves, and connectors and more particularly relates to expanding/shrinking either temperature auto-regulated, self-heating recoverable articles or non-self heating recoverable articles. The invention also relates to auto-regulated, self-heating apparatus useful for expanding/shrinking articles.

2. Background of the Invention

Generally, heat-recoverable, or heat-shrinkable, articles are composed of cross-linked polymers. When such materials are exposed to heat at or in excess of their crystalline transition temperatures they may be expanded and cooled in that expanded configuration to create a heat recoverable article. In the alternative, if the article was previously stretched and cooled, it is rendered dimensionally heat-unstable and upon exposure to heat at or in excess of the crystalline transition temperature, the material recovers to its dimensionally heat-stable configuration, i.e. the unstretched configuration. As is readily appreciated by those of ordinary skill in the art, there are many such materials, polymeric or not, exhibiting a large range of crystalline transition temperatures which are selected to suit a particular purpose based upon the physical characteristics of both the material and its crystalline temperature.

The prior art relating to the expansion of heat-recoverable articles deals only with the expansion of heat recoverable articles that are not temperature auto-regulated or self-heating. Whether the article is a flat sheet, a tube, or other shape, the article is first heated, then stretched and then cooled while still in tension so that the article retains the stretched shape until it is heated sufficiently to cause it to recover to its relaxed shape.

In the prior art the recoverable material is placed typically in a hot glycerin bath to soften it prior to stretching it. For small pieces or short lengths of tubes the stretching process is generally performed manually with the operator manually placing the article into and removing it from the glycerin bath. Once the recoverable article is up to temperature, the stretching process is performed by placing the article in a stretching jig or by pushing a mandrel into the tube, and then cooling the article below the crystalline temperature while the stretching mechanism is still in place. The stretching operation can either be begun with the article still in the glycerin bath or immediately after it has been removed from the bath. If the stretching is performed after the article is removed from the bath, the stretching may be uneven since the article may cool unevenly due to remaining drops of hot glycerin on or in the article when it is removed from the bath. Additionally, the article may also be stretched in a direction other than the direction or directions opposite to the direction or directions in which the recovery is desired upon reheating, i.e. the length of a tube into which a mandrel is inserted may have its length increased which will result in an unpredictable reduction in its length when recovery is initiated.

Additional problems occur due to non-uniform heating of the mass of the recoverable material in the heat-recoverable article. Thus, in heat-recoverable articles in which the heat-recoverable material is of an even thickness or even mass distribution, the problem has been to obtain uniform or even heating of the heat-recoverable material to assure uniform recovery. In other articles wherein the thickness or mass of the heat-recoverable material differs in various parts of the heat-recoverable article, the problem has been to obtain appropriate heat distribution and sufficient heating in each of the various areas of different thickness or different mass in order to achieve sufficient recovery of the higher mass areas without overheating the areas of lower mass.

U.S. Pat. No. 3,253,618 ("Cook") discloses that a heat-shrinkable tube of elastic memory material reinforced with braided fibers exhibits an undesirable change in length when the diameter of the tube is reduced by shrinkage. Cook points out that an increase in length upon shrinkage should be kept to a minimum in the case of splices for electric cables due to the limited space available for such axial extension. To minimize such axial extension, Cook provides a tubular shape with reinforcement on an inner surface, an outer surface or as an internal reinforcement. The reinforcement comprises two knitted layers, one being a left-hand stitch and the other being a right-hand stitch to offset the twisting tendency of each layer. The reinforced tube is heated, expanded and cooled to provide an elastic memory material. To provide maximum radial and minimal axial dimensional change, the angle between the axis of the knit and axis of the tube should be 15° to 19°. The heating is performed by passing the reinforced tube through a tank containing a heating liquid such as glycerine at 295° F. and the expanding is performed by applying pressure such as a 5 psi pressure differential to the interior of the tube. The knitted reinforcement prevents the tube from shrinking axially more than 10% during the expansion or during heat shrinkage of the tube.

U.S. Pat. No. 3,597,372 ("Cook") discloses several methods of manufacturing heat-recoverable thermoplastic materials. According to one method, a considerable amount of built-in stress is imparted during fabrication and the material is quenched to hold the molecules in the stressed condition. In the case of cross-linked polyethylene, the material is heated above the crystalline melting temperature so the material behaves as an elastomer, the material is deformed while in the elastomeric state and the temperature of the material is reduced to cause crystallization which maintains the cross-linked polymer in its deformed condition. Another method involves heating and applying an external force to deform a heat recoverable elastomeric article into a desired heat-recoverable configuration, quenching the deformed article and then releasing the external force. The elastomeric article can be an uncured elastomer in which a normally solid, heat-flowable material such as a thermoplastic or non-elastic resinous material is incorporated. Alternatively, the elastomeric article can be a plasticized thermoplastic material such as a plasticized polyvinyl chloride. After the elastomeric article is formed, it is vulcanized or cross-linked. The heating is at a temperature at which the thermoplastic or resinous material loses the major portion of its strength. The elastomeric article can be a heat-shrinkable tubing or a heat-expandable tubing. To produce the heat shrinkable tubing, tubing is heated in a hot glycerine bath and a heated mandrel is used to expand the tubing after which the tubing is cooled in water while over the mandrel. To produce a T-shaped 3-finger splice for use in a cable harness, a hollow T-shaped article is molded, the article is immersed in glycerine at 150° C., the finger orifice is mechanically expanded to a desired dimension and the article is cooled in water.

U.S. Pat. No. 4,035,534 ("Nyberg") discloses a process of preparing a composite tube wherein a heat-recoverable tube adhesively bonded to an inner or outer elastomeric tube is heated and expanded on a mandrel, cooled and the mandrel is withdrawn. Alternatively, the heat-shrinkable tube is heated and expanded on a heated mandrel and the inner surface of an elastomeric tube is bonded to the heat-shrinkable tube either before or after cooling the heat-shrinkable tube. The elastomeric tube can be an inner layer which includes conductive particles such as carbon black or metal particles.

SUMMARY OF THE INVENTION

The invention provides a process for using a heat recoverable article by taking advantage of the auto-regulating temperature properties of lossy heating particles which produce heat when subjected to an alternating magnetic field. Thus, over heating and/or excessive temperature conditions can be avoided in the process.

According to the process of the invention, an article of plastic is deformed from a heat-stable configuration to a heat-unstable configuration which will return to the heat-stable configuration if the article is heated to a heat recovery temperature. Lossy heating particles are provided which produce heat when subjected to an alternating magnetic field, the particles having a Curie transition temperature at least equal to the heat recovery temperature. These particles are preferably ferrites. The article is heated to at least the heat recovery temperature during the deforming step by exposing the particles to an alternating magnetic field such that the particles are heated to their Curie transition temperature. The article is cooled in the heat-unstable configuration to a temperature which is lower than the heat recovery temperature while preventing the article from returning to the heat-stable configuration.

In accordance with a preferred embodiment, the article comprises a tube which is expanded to the heat-unstable configuration. The tube can be expanded by means of a mandrel or by pressurized air. To prevent the tube from expanding beyond a predetermined limit by the pressurized air, an expandable braided mesh can be provided around the tube during the deforming step. Alternatively, the braided mesh can be provided within the tube. For instance, the deforming step can comprise inflating and elastomeric tubing within the tube, the elastomeric tubing including expandable braided mesh means for limiting expansion of the elastomeric tubing to a maximum diameter. The braided mesh means can comprise a braided mesh tubing surrounding the elastomeric tubing or embedded within the elastomeric tubing. The braided mesh allows the tube to be expanded without substantial stretching of the tube in a direction parallel to a central axis of the tube, particularly when the tube is moved with respect to the braided mesh tubing.

The heating of the tube can be accomplished in various ways. For instance, the lossy particles can be provided within the tube or within a tool used in the deforming step. In either case, the particles can be heated by an induction coil provided within the tube or surrounding the tube. Likewise, when the particles are incorporated in a tool, the tool can be provided within the tube or surrounding the tube. Such tools include a mandrel, a caterpillar, an expandable tube or other mechanical expedient. Also, instead of lossy heating particles, the caterpillar, mandrel and/or expandable tube can include a ferromagnetic alloy for heating the plastic tube.

BRIEF DESCRIPTION OF THE DRAWING

The invention will now be described with reference to the accompanying drawing, in which:

FIG. 2b shows a modification of the arrangement shown in FIG. 2a;

FIG. 2c shows another modification of the arrangement shown in FIG. 2a;

DETAILED DESCRIPTION OF PREFERRED EMBODIMENTS

The invention provides a process for producing a heat-recoverable article of plastic. The process of the invention is applicable to auto-regulated, self-heating recoverable articles or non-self-heating recoverable articles. Such auto-regulated, self-heating recoverable articles include lossy particles dispersed therein.

U.S. Pat. No. 4,914,267, the disclosure of which is hereby incorporated by reference, discloses the advantages of using Curie temperature limited heating for various heat-recoverable articles. International application WO 90/03090, the disclosure of which is hereby incorporated by reference, discloses heat-recoverable devices which incorporate lossy heating particles therein. The lossy heating particles, such as ferromagnetic or ferrimagnetic particles, produce heat when subjected to an alternating magnetic field and they have a Curie temperature at or above the heat-recovery temperature of the material of the article but preferably below the decomposition temperature of the material. The heat-recoverable devices disclosed in WO90/03090 are self-heating and auto-regulating due to the lossy particles. That is, the lossy particles can be heated by an induction coil which produces an alternating magnetic field. Accordingly, heat can be applied to such heat-recoverable articles in an auto-regulated manner to efficiently heat the heat-recoverable articles in a manner such that over heating and under-heating areas of the articles is avoided. The present invention utilizes the advantages of the auto-regulating temperature phenomenon in producing heat-recoverable articles.

The process of the invention can be performed without the need for applying external heat. In particular, the process of the invention utilizes the unique heating characteristics of "lossy heating particles" which may be present in the heat-recoverable article or in a tool used to produce the heat-recoverable article. The lossy particles can comprise ferromagnetic particles but preferably comprise electrically non-conductive ferrimagnetic particles and more preferably, ferrite particles. The term "lossy heating particles" as used herein means any particle having particular properties which result in the particles being capable of generating sufficient heat for purposes of this invention when subjected to an alternating magnetic field having a specified frequency. Thus, any particle having these properties and being useful in the present invention is within the scope of this definition.

The invention provides a process for producing a heat recoverable article of plastic by the following steps:
  deforming an article of plastic from a heat-stable configuration to a heat-unstable configuration which will return to the heat-stable configuration if the article is heated to a heat recovery temperature;
  providing lossy heating particles which produce heat when subjected to an alternating magnetic field, the particles having a Curie transition temperature at least equal to the heat recovery temperature;
  heating the article to at least the heat recovery temperature during the deforming step by exposing the particles to an alternating magnetic field such that the particles are heated to their Curie transition temperature; and
  cooling the article in the heat-unstable configuration to a temperature which is lower than the heat recovery temperature while preventing the article from returning to the heat-stable configuration.

In a preferred embodiment, the article comprises a tube. However, the article can comprise a sheet, wire or rod having other than a cylindrical shape, or an irregular shaped article. For instance, the irregular shaped article could be udder-shaped wherein a series of small diameter tubes are connected to a larger diameter tube.

The drawing shows various arrangements for producing a heat-recoverable tube.

Figure 1A:
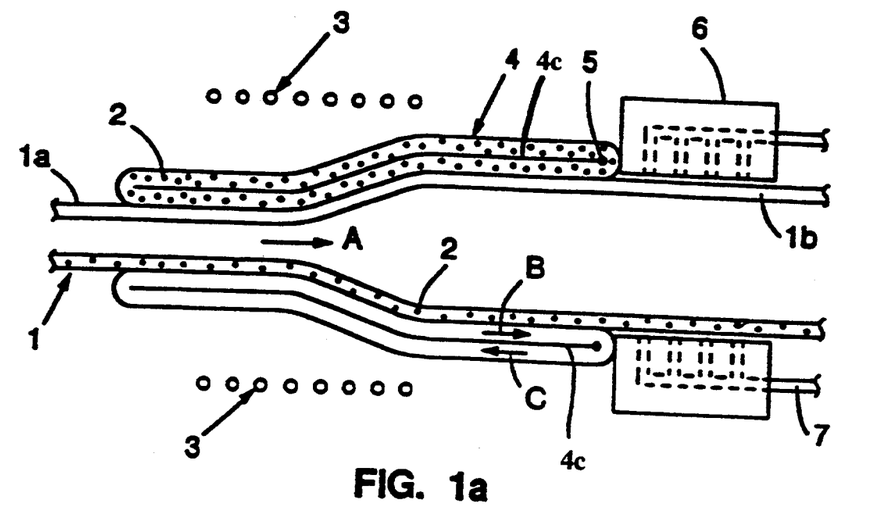
FIG. 1a shows a cross-section of a caterpillar arrangement for deforming an article of plastic from a smaller heat-stable configuration to a larger heat-unstable configuration in accordance with the invention.

FIG. 1a shows a caterpillar arrangement for producing a heat recoverable tube. In particular, heat recoverable tube 1 having a heat-stable configuration 1a is deformed to heat-unstable configuration 1b. Heat-unstable configuration 1b will return to heat-stable configuration 1a if tube 1 is heated to a heat recovery temperature. Lossy heating particles 2 are provided which produce heat when subjected to an alternating magnetic field, particles 2 having a Curie transition temperature at least equal to the recovery temperature. Tube 1 is heated to at least the heat recovery temperature during the deforming step by exposing particles 2 to an alternating magnetic field so that particles 2 are heated to their Curie transition temperature. Particles 2 can be dispersed within the wall of tube 1 (as shown in the lower portion of FIG. 1a) and/or particles 2 can be dispersed within tool 4 used in the deforming step (as shown in the upper portion of FIG. 1a). Particles 2 are heated by means of induction coil 3 and sufficient heat is transmitted to tube 1 by heated particles 2 to raise the temperature of the tube to at least the heat recovery temperature and to soften tube 1 so that it can expand to heat-unstable configuration 1b.

The tool shown in FIG. 1a comprises caterpillar means also referred to by numeral 4 which is rotatable along the outer surface of tube 1. Caterpillar means 4 comprises an endless tubular belt of elastomeric material, the belt including an inner tubular section and an outer tubular section. The inner tubular section has opposite ends of a radially outer surface thereof joined to opposite ends of a radially inner surface of the outer tubular section. The belt is rotatable about an endless path extending around the opposite ends of the inner and outer tubular sections.

The belt can include guide means 5 between the inner and outer sections at a radially expanded end of the belt, as shown in FIG. 1a. Stop means 6 can be provided at the expanded end of the belt for preventing movement of guide means 5 in a direction parallel to the central axis of tube 1. Accordingly, tube 1 can be deformed to heat-unstable configuration 1b in a continuous manner by moving tube 1 in the direction of arrow A, as shown in FIG. 1a or by moving caterpillar 4 in the direction of arrow opposite to direction A.

Tube 1 can be expanded to heat-unstable configuration 1b in various ways. For instance, a suitable shaped mandrel (not shown) could be inserted in tube 1. Alternatively, the interior of tube 1 could be pressurized by means such as pressurized air or liquid. To prevent expansion of tube 1 beyond a predetermined diameter when the tube is deformed by pressurizing the interior of the tube, suitable means can be provided around caterpillar 4 or an expandable braided mesh (not shown) can be incorporated in caterpillar 4. That is, a braided mesh tubing can be provided in the belt of the caterpillar to limit expansion of the caterpillar to a maximum diameter. The braided mesh can comprise a woven pattern of metal or plastic filaments. As the inner section of the belt rotates in the direction of arrow B and the outer section of the belt rotates in the direction of arrow C, the elastomeric material of the belt resiliently presses against the outer periphery of tube 1.

The tube is cooled to heat-unstable configuration 1b by suitable cooling means 7. For instance, stop means 6 can include a plurality of fluid passages therein with outlets of the passages facing the outer periphery of the expanded tube. The cooling medium preferably comprises air which is blown onto the exterior of the tube. In the case where the tube is expanded by pressurizing the interior of the tube, stop means 6 performs an additional function of preventing undesirable further expansion of the tube during the cooling step. Whether the tube is expanded by a mandrel or pressure, the tube is prevented from returning to heat-stable configuration 1a during the cooling step.

Figure 1B:
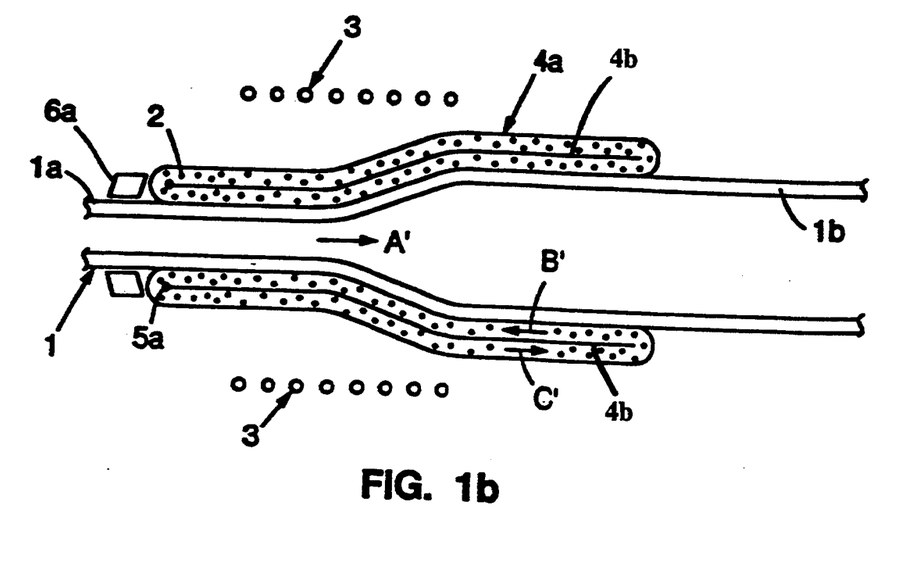
FIG. 1b shows a cross-section of a caterpillar arrangement for deforming an article of plastic from a larger configuration to a smaller configuration in accordance with the invention.

Caterpillar 4 can also be used to recover previously expanded tubing, (shrink tubing having no memory such as thermoplastic tubing) and/or melt adhesive on an inner surface of the tubing. For instance, caterpillar 4 can be slid on recoverable tubing in heat-unstable configuration 1b, the tubing can be heated to its recovery temperature and shrunk to heat-stable configuration 1a. Heating can be accomplished by exposing heating means supported by caterpillar 4 to an alternating magnetic field. Accordingly, self-regulating, self-heating caterpillar 4 can be used to heat and shrink heat recoverable tubing on electrical wires which are spliced together and/or to melt hot melt adhesive on an inner surface of tubing.

The heating means can comprise lossy heating particles 2 provided in elastomeric material of caterpillar 4 or in a lubricant 4b between inner and outer tubular sections of caterpillar 4, as shown in FIG. 1b. The lubricant can be any suitable liquid or solid lubricant composition. For instance, U.S. Pat. No. 4,868,967 (the disclosure of which is hereby incorporated by reference) discloses suitable lubricants which can be used in caterpillar 4. Alternatively, the heating means can comprise an endless expandable braided mesh tubing 4c of ferromagnetic alloy wire supported by or between the inner and outer sections of the elastomeric material of caterpillar 4, as shown in FIG. 1a.

Caterpillar 4a can be advanced along tube 1 such that an inner section thereof travels in direction B' while the outer section thereof travels in direction C' by suitable means such as member 6a which pushes against one end of caterpillar 4a, as shown in FIG. 1b. Guide means 5a between the inner and outer sections of caterpillar 4a cooperates with member 6a to advance caterpillar 4a along tube 1 in the direction of arrow A'.

Figure 2A:
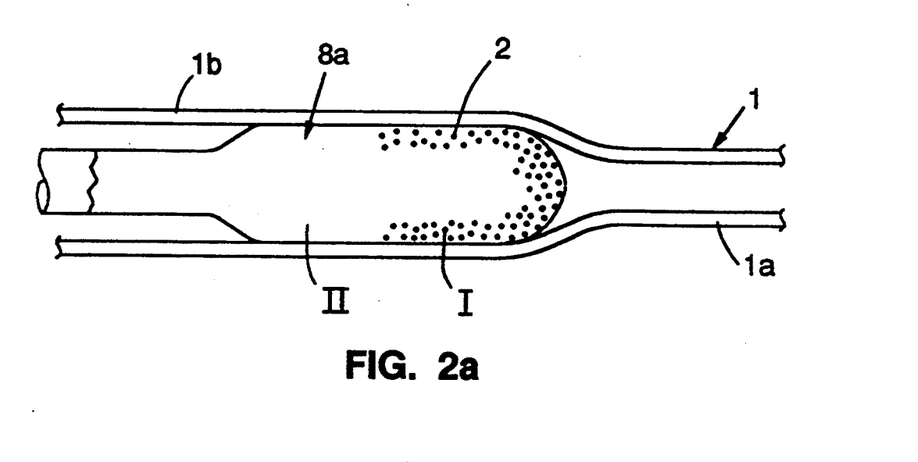
FIG. 2a shows a partial cross-section of a mandrel arrangement for expanding a plastic tube in accordance with the invention.
Figure 2B:
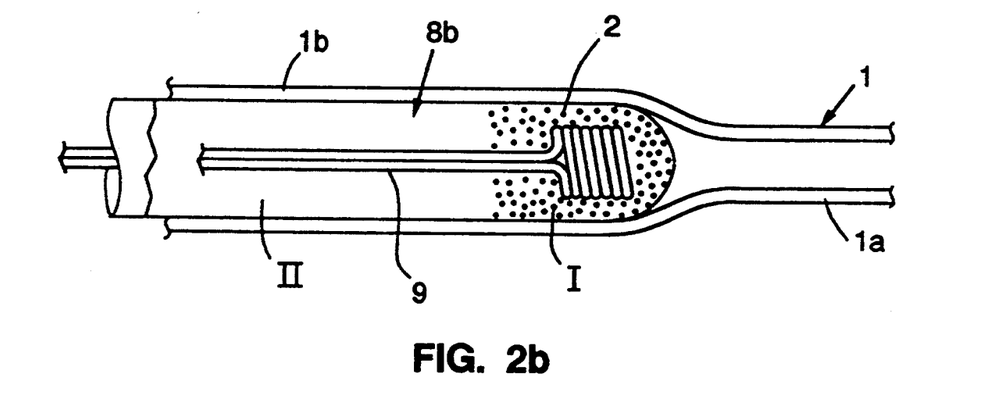
Figure 2C:
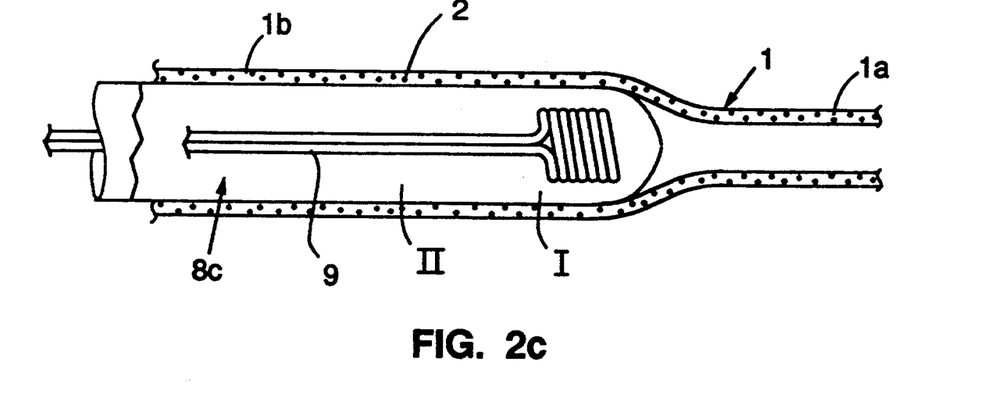
Figure 6:
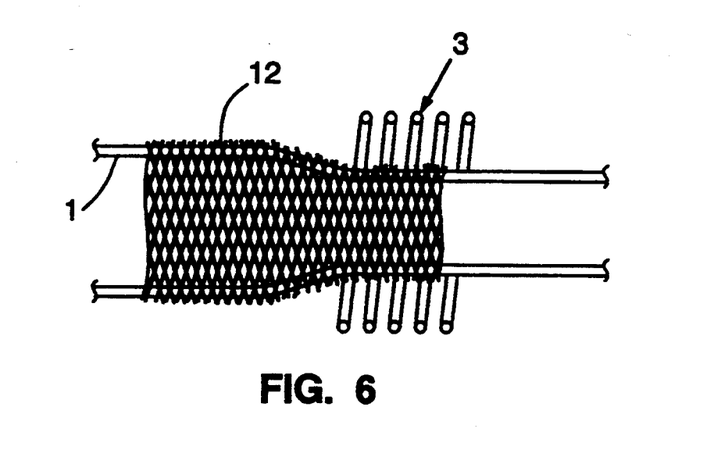
FIG. 6 shows an expandable braided mesh arrangement for carrying out the process of the invention.
Figure 7:
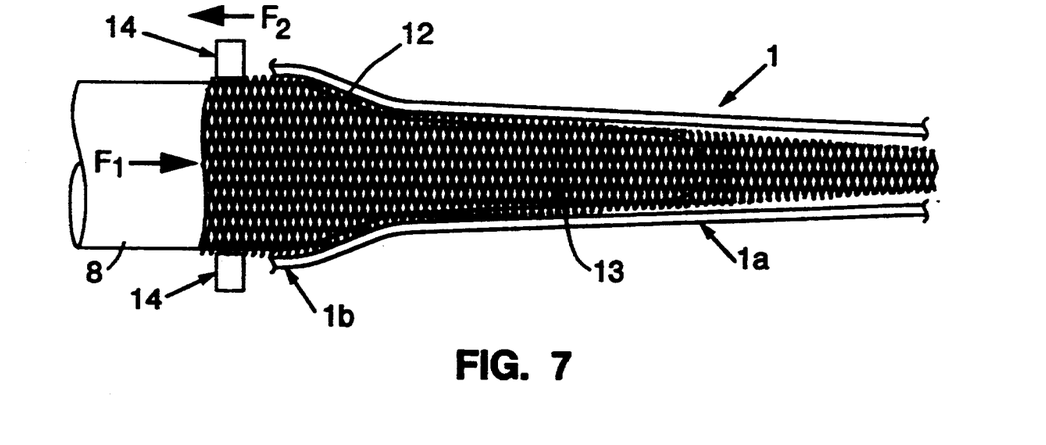
FIG. 7 shows a modification of the arrangement shown in FIG. 6.

FIGS. 2a–c show alternative arrangements for expanding tube 1. In FIG. 2a, mandrel 8a includes lossy heating particles 2 in heating zone I. Particles 2 can be provided throughout the cross section of zone I or only in an area adjacent the outer periphery of zone I. Cooling zone II having the same diameter as zone I is provided to maintain tube 1 in heat-unstable configuration 1b during cooling. Mandrel 8a includes a reduced diameter portion beyond cooling zone II. In FIG. 2b, mandrel 8b having induction coil 9 therein is used to expand tube 1 to heat-unstable configuration 1b. As shown in FIG. 2b, particles 2 can be dispersed throughout heating zone I of mandrel 8b. Alternatively, as shown in FIG. 2c, particles 2 can be incorporated in tube 1 instead of in mandrel 8c. In either case, tube 1 is moved relative to mandrel 8. Also, an expandable braided mesh (as shown in FIG. 7) can be provided between mandrel 8 and the interior of tube 1 or such a braided mesh could be used on the exterior of tube 1 during expansion by mandrel 8 (as shown in FIG. 6). Such a braided mesh limits longitudinal stretching of tube 1 and provides a means for applying a force to tube 1 opposing the force applied to mandrel 8. Mandrel 8 can be of any suitable electrically non-conducting material such as Teflon ®.

Figure 3:
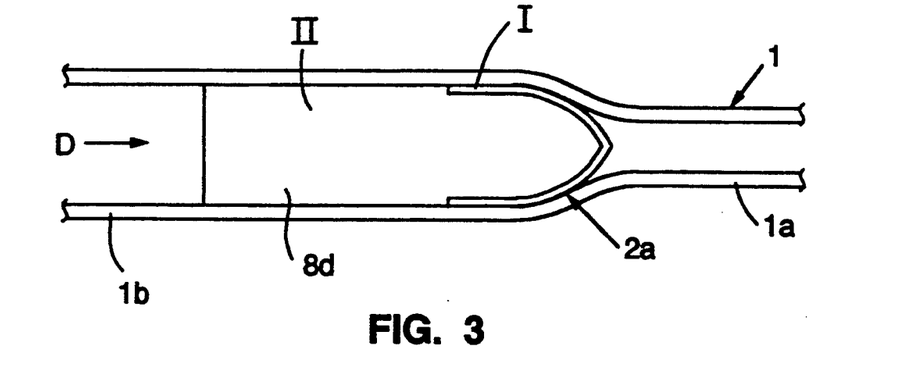
FIG. 3 shows a floating mandrel arrangement for expanding a plastic tube in accordance with the invention.

FIG. 3 shows floating mandrel 8d for expanding tube 1 from heat-stable configuration 1a to heat unstable configuration 1b. Cooling zone II is provided to hold tube 1 in heat-unstable configuration 1b while tube 1 is cooled below its recovery temperature. Mandrel 8d can include lossy heating particles 2 (not shown) in heating and expanding zone I. Alternatively, mandrel 8d could include a layer of a ferromagnetic alloy 2a in zone I for heating tube 1 or lossy heating particles could be dispersed within tube 1. The ferromagnetic alloy 2a can be used on mandrels 8a–b instead of particles 2 and one or more metal layers such as copper can be provided above or below the alloy layer 2a. Mandrel 8d can be advanced along tube 1 by air pressure applied in the direction of arrow D. Suitable induction coil means (not shown) for heating mandrel 8d or tube 1 is movable along the length of tube 1 as tube 1 is expanded. The position of the coil means relative to mandrel 8d can be adjusted by electrical impedance monitoring the induction coil. To prevent undesirable axial stretching of tube 1 during the expansion, suitable braided mesh tubing can be provided between mandrel 8d and the inside of tube 1 (as shown in FIG. 7) or the braided mesh tubing can be provided around the periphery of tube 1 (as shown in FIG. 6).

Figure 4A:
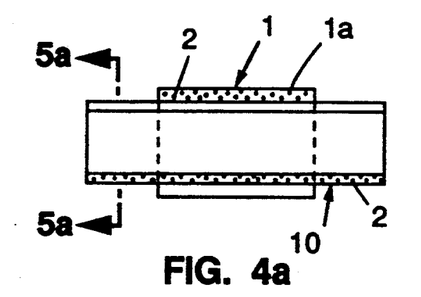
FIGS. 4a–d show an expandable tube arrangement for carrying out the process of the invention.
Figure 4B:
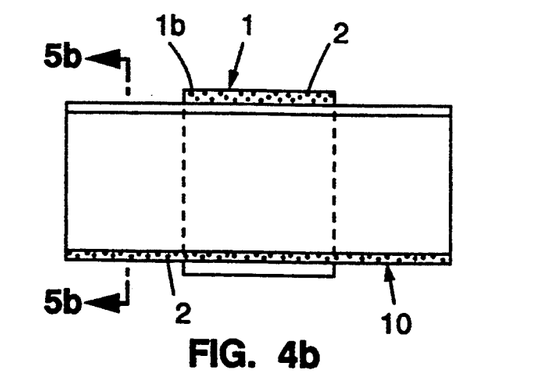

FIGS. 4a–b show an arrangement for expanding tube 1 by means of expandable tube 10 provided within tube 1. In this case, tube 1 and tube 10 are not moved axially with respect to each other during the deforming step. Expandable tube 10 can be pressurized or a mandrel can be passed through tube 10 to deform tube 1 from heat-stable configuration 1a (as shown in FIG. 4a) to heat-unstable configuration 1b (as shown in FIG. 4b). To prevent tube 1 from being pressurized beyond a predetermined diameter, an expandable braided mesh tubing can optionally be provided between expandable tube 10 and tube 1 (as shown in FIG. 7) or the braided mesh tubing can be provided around the periphery of tube 1 (as shown in FIG. 6). However, such expandable braided mesh tubing is not necessary to expand tube 1. For instance, tube 1 can be expanded within a suitably shaped die. Also, tube 1 can be heated by particles 2 dispersed in tube 1 (as shown in the upper portions of FIGS. 4a–b) or in tube 10 (as shown in the lower portions of FIGS. 4a–b).

Figure 4C:
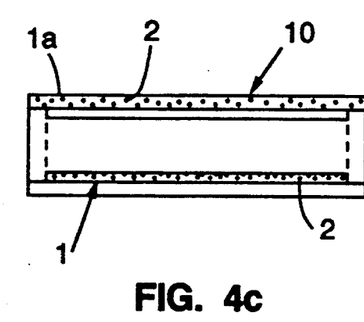
Figure 4D:
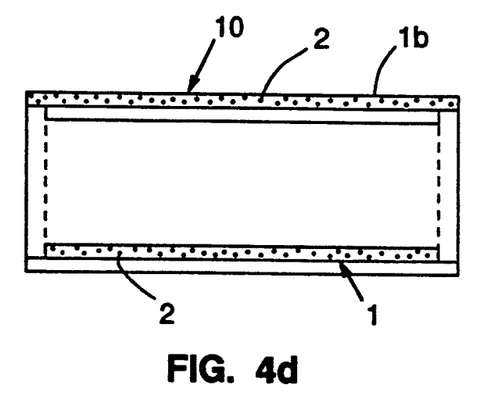

FIGS. 4c–d show cross-sections of an arrangement wherein expandable tube 10 surrounds tube 1. In this case, tube 1 is expanded by suitable means such as fluid pressure or a mandrel. Tube 1 can be heated by particles 2 dispersed in expandable tube 10 (as shown in the upper portions of FIGS. 4c–d) or particles dispersed in tube 1 (as shown in the lower portions of FIGS. 4c–d).

Figure 5A:
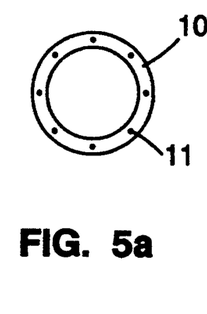
FIGS. 5a–b show cross-sections of the expandable tube shown in FIGS. 4a–b.
Figure 5B:
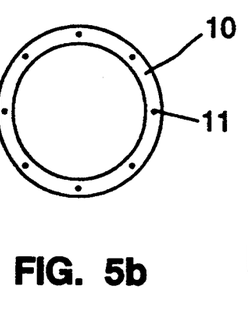

To prevent expandable tube 10 from stretching axially in a direction parallel to a central axis of tube 1, expandable tube 10 can optionally include axially extending, circumferentially spaced-apart fibers 11 of nylon, fiberglass, metal or other high strength material. When tube 10 shown in FIGS. 4a–b includes fibers 11, FIG. 5a shows a cross-section taken along the line 5a—5a of FIG. 4a and FIG. 5b shows a cross-section taken along the line 5b—5b of FIG. 4b.

Figure 5C:
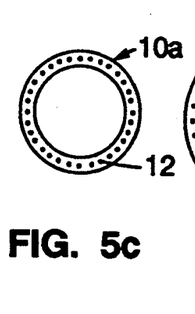
FIGS. 5c–d show cross-sections of a modification of the expandable tube shown in FIGS. 4a–b.
Figure 5D:
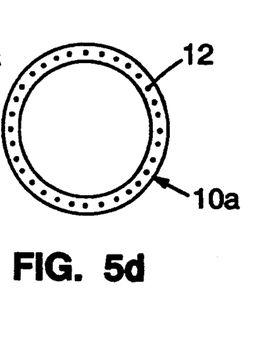

To limit radial expansion of expandable tube 10, a suitably shaped die (not shown) can be used to surround expandable tube 10 and thereby limit radial expansion of expandable tube 10. Alternatively, tube 1 could be placed within a suitably shaped die and expanded by fluid pressure without using expandable tube 10. As shown in FIGS. 5c–d, however, expandable tube 10a can include braided mesh tubing 12 within the elastomeric material of expandable tube 10a. FIG. 5c shows expandable tube 10a prior to expansion and FIG. 5d shows tube 10a in the fully expanded condition with braided mesh tubing 12 being radially stretched to its maximum diameter.

FIGS. 6 and 7 show details of arrangements wherein expandable braided mesh tubing 12 is used during the deforming step. In particular, braided mesh tubing 12 can be provided around the exterior of tube 1 as shown in FIG. 6 to limit expansion of tube 1 to a maximum diameter when the interior of the tube is pressurized or expanded by mandrel 8 during the deforming step. FIG.

7 shows how braided mesh tubing 12 can be provided within tube 1 such that mandrel 8 having tip 13 can be used to expand the tube. In this case, a force $F_1$ is applied to mandrel 8 and clamping means 14 applies an opposing force $F_2$ to braided mesh tubing 12. This allows tube 1 to be radially expanded with minimum longitudinal stretching thereof while tube 1 is in a heated weak condition. The size of the mesh of braided mesh tubing 12 is selected depending on the degree of expansion desired. Also, for minimum longitudinal change in length, the braid angle should be 90° at the mid-point of the expansion process. Instead of using mandrel 8, a bladder provided internally of braided mesh tubing 12 or a bladder which includes braided mesh tubing 12 as part of its structure could be filled with gas or liquid to expand tube 1 to its heat-unstable configuration 1b.

The choice of the material used for lossy heating particles 2 or the ferromagnetic alloy (when used as wire of braided mesh tubing 12 or as a coating on mandrel 8) depends on the recovery temperature of the plastic article to be deformed. For instance, if the article comprises polyolefin having an expansion temperature of about 125° C., iron-nickel Alloy 34 (having 34% nickel and a Curie temperature of about 165° C.) would be suitable for particles 2 or the ferromagnetic alloy. Alloy 42, (having 42% nickel and a Curie temperature of about 320° C.) would provide a self-regulating temperature which might damage polyolefin. Alloy 42 is useful, however, for heat shrinking Teflon® tubing which has a recovery temperature of about 320° C. Caterpillar 4, mandrel 8 and expandable tube 10 should be of a material which is stable, i.e. not degraded, at the temperatures used in the deforming step. Mandrel 8 should not change shape at such temperatures whereas caterpillar 4 and expandable tube 10 should be resilient but resist stretching in the radial direction at such temperatures. As such, the Curie temperature should be at least equal to an expansion temperature suitable for expanding the plastic article but lower than a temperature which would damage the article. A Curie temperature 40° C. higher than the expansion temperature provides suitable heating of the plastic article.

While the invention has been described with reference to the foregoing embodiments, various changes and modifications may be made thereto which fall within the scope of the appended claims.

What is claimed is:

1. A caterpillar heating device, comprising: an endless tubular belt of elastomeric material, the belt including an inner tubular section and an outer tubular section, the inner tubular section having opposite ends of a radially outer surface thereof joined to opposite ends of a radially inner surface of the outer tubular section, the belt being rotatable about an endless path extending around the opposite ends of the inner and outer tubular sections; and heating means for heating the belt to an auto-regulated temperature by exposing the heating means to an alternating magnetic field.

2. The caterpillar of claim 1, wherein the heating means comprises lossy heating particles, the lossy heating particles having a Curie transition temperature and being supported by the belt.

3. The caterpillar of claim 2, wherein the lossy heating particles are distributed throughout the elastomeric material.

4. The caterpillar of claim 2, wherein the lossy heating particles are distributed throughout a lubricant filling a space between the inner and outer surfaces of the tubular sections.

5. The caterpillar of claim 1, wherein the heating means comprises an endless expandable braided mesh tubing comprised of wire of a ferromagnetic alloy, the braided mesh tubing being supported by the belt for movement about the endless path.

6. The caterpillar of claim 1, further comprising an endless expandable braided mesh tubing comprised of thermoplastic wire supported by the belt for movement about the endless path.

7. A tool for producing a heat recoverable article of plastic, comprising:

deforming means for deforming an article of plastic from a heat-stable configuration to a heat-unstable configuration which returns to the heat-stable configuration by heating the article to a heat recovery temperature; and heating means cooperable with the deforming means for heating the article while the deforming means deforms the article to the heat-unstable configuration, the heating means comprising a ferromagnetic alloy or lossy heating particles having a Curie transition temperature, the heating means heating the article to an auto-regulated temperature at least equal to the heat recovery temperature by exposing the ferromagnetic alloy or lossy heating particles to an alternating magnetic field.

8. The tool of claim 7, wherein the heating means comprises the lossy heating particles, the Curie transition temperature of the lossy heating particles being at least equal to the heat recovery temperature and the lossy heating particles being supported by the deforming means.

9. The tool of claim 7, wherein the heating means comprises an expandable braided mesh tubing comprised of wire of the ferromagnetic alloy.

10. The tool of claim 7, wherein the deforming means comprises a mandrel, the mandrel having a tip for insertion in a heat recoverable tube to be expanded and the mandrel including an expanding section having a configuration corresponding to the heat-unstable configuration of the heat recoverable tube.

11. The tool of claim 10, further comprising induction coil means for subjecting the alloy or the lossy heating particles to an alternating magnetic field so that the alloy or lossy heating particles are heated to their Curie transition temperature.

12. The tool of claim 11, wherein the induction coil means is located internally of the mandrel, the induction coil means including an induction coil within the expanding section of the mandrel.

13. The tool of claim 10, wherein the mandrel includes a cooling zone, the cooling zone having a configuration corresponding to the heat-unstable configuration of the heat recoverable tube, the expanding section being located between the tip and the cooling section.

14. The tool of claim 10, wherein the mandrel comprises a floating mandrel.

15. The tool of claim 7, wherein the deforming means comprises a mandrel and the heating means comprises a layer of a ferromagnetic alloy on the mandrel.

16. The tool of claim 8, wherein the deforming means comprises a mandrel.

17. The tool of claim 9, wherein the deforming means comprises a mandrel.

18. The tool of claim 7, wherein the deforming means comprises an expandable tube of elastomeric material.

19. The tool of claim 18, wherein the expandable tube includes means for limiting axial stretching thereof.

20. The tool of claim 19, wherein the means for limiting axial stretching comprises a plurality of axially extending high-strength fibers which are spaced apart in a circumferential direction around the expandable tube.

21. The tool of claim 18, wherein the expandable tube includes means for limiting radial expansion thereof.

22. The tool of claim 21, wherein the means for limiting radial expansion comprises a braided mesh tubing.

23. The tool of claim 22, wherein the braided mesh tubing is comprised of plastic filaments and is supported by the expandable tube.

24. The tool of claim 8, wherein the deforming means comprises an expandable tube of elastomeric material.

25. The tool of claim 9, wherein the deforming means comprises an expandable tube of elastomeric material.

26. The tool of claim 9, wherein the deforming means comprises an endless tubular belt of elastomeric material, the belt including an inner tubular section and an outer tubular section, the inner tubular section having opposite ends of a radially outer surface thereof joined to opposite ends of a radially inner surface of the outer tubular section, the belt being rotatable about an endless path extending around the opposite ends of the inner and outer tubular sections, the belt including guide means between the inner and outer sections, the tool further including stop means cooperable with the guide means for moving the belt along a tube when the belt surrounds the tube.

27. The tool of claim 26, wherein the braided mesh tubing is supported by the belt.

28. A tool for producing a heat recoverable article of plastic, comprising:

deforming means for deforming an article of plastic from a heat-stable configuration to a heat-unstable configuration which returns to the heat-stable configuration by heating the article to a heat recovery temperature, the deforming means comprising an endless tubular belt of elastomeric material, the belt including an inner tubular section and an outer tubular section, the inner tubular section having opposite ends of a radially outer surface thereof joined to opposite ends of a radially inner surface of the outer tubular section, the belt being rotatable about an endless path extending around the opposite ends of the inner and outer tubular sections; and heating means cooperable with the deforming means for heating the article while the deforming means deforms the article to the heat-unstable configurations, the heating means heating the article to an auto-regulated temperature at least equal to the heat recovery temperature by exposing the heating means to an alternating magnetic field.

29. The tool of claim 28, wherein the heating means comprises lossy heating particles distributed throughout the elastomeric material.

30. The tool of claim 28, wherein the heating means comprises lossy heating particles distributed throughout a lubricant filling a space between the inner and outer tubular sections.

31. The tool of claim 28, further comprising an endless expandable braided mesh tubing comprised of thermoplastic wire supported by the belt for movement about the endless path.

32. The tool of claim 28, further comprising guide means between the inner and outer tubular sections and stop means cooperable with the guide means for moving the belt along a tube when the belt surrounds the tube.

* * * * *

UNITED STATES PATENT AND TRADEMARK OFFICE
CERTIFICATE OF CORRECTION

PATENT NO. : 5,406,055

DATED : April 11, 1995

INVENTOR(S) : THOMAS H. McGAFFIGANN

It is certified that error appears in the above-indentified patent and that said Letters Patent is hereby corrected as shown below:

"CATERPILLAR" is, in fact, a registered trademark. Throughout the patent --"CATERPILLAR" -- should be capitalized.

Signed and Sealed this

Fifth Day of November, 1996

Attest:

BRUCE LEHMAN

*Attesting Officer*      *Commissioner of Patents and Trademarks*